Patented July 16, 1929.

1,721,034

UNITED STATES PATENT OFFICE.

IWAN OSTROMISLENSKY, OF NEW YORK, N. Y.

POLYMER OF VINYL CHLORIDE AND PROCESS OF MAKING THE SAME.

No Drawing.   Application filed November 8, 1926.   Serial No. 147,202.

This invention relates to polymers of vinyl chlorid and processes of making the same. One object of the invention is to produce polymerized vinyl chlorid in such a state that it can be dissolved in a practical solvent and formed into films or other articles having durable flexibility. Another object is to provide processes of preparing such polymerized vinyl chlorid. Still another object is to produce, from such polymer, transparent films of practical non-inflammability and exceptionally great flexibility even when kept under adverse conditions. Other objects will hereinafter appear.

It has heretofore been proposed to produce films and other shaped articles from polymerized vinyl chlorid with the aid of suitable solvents. There has, however, always been a tendency for the products, especially sheets and films eventually to become brittle and colored.

I have found that polymerized vinyl chlorid can be prepared in several modifications having different properties. For convenience I have renamed polymerized vinyl chlorid, calling it caoupren chlorid. The several modifications I have also designated as alpha, beta, delta and gamma caoupren chlorid. As polymerization progresses, each of these modifications changes into the next one,—thus alpha is first formed and changes to beta, the latter to delta, and so on.

From my investigation of these modifications, I have found out how to avoid the brittleness and discoloration of the above mentioned products. I have found that beta caoupren chlorid when purified from other polymers and made into such articles as films, for example, displays exceptional and lasting flexibility while at the same time it has other desirable qualities such as, transparency, freedom from color and substantial non-inflammability. It imparts such flexibility to a useful extent when it is the dominant ingredient in a mixture containing some of a less flexible modification.

Beta caoupren chlorid can readily be distinguished from the other modifications by its different susceptibility to certain solvents. It is soluble in monochlorbenzol, but insoluble in acetone. By insoluble I mean that, even though it swells in acetone, it will not sufficiently dissolve in acetone to produce a flowable film or varnish solution or "dope"—that is, I mean insolubility in the practical sense. The alpha modification, on the other hand, is soluble in acetone, while the gamma and delta modifications are insoluble in both acetone and monochlorbenzol, although the delta form will swell in and absorb monochlorbenzol.

I have found that beta caoupren chlorid may be prepared in several different ways. For example, the progressive polymerization of vinyl chlorid may be interrupted at the stage where the maximum beta caoupren chlorid has been formed, or the alpha modification may be converted into the beta form by further polymerization or the gamma and delta modifications may be changed into the beta form by suitable treatment. In the latter case the beta form has a strong tendency to revert to the modification from which it has been prepared.

I have also found that in making articles, such as films, from solutions of beta caoupren chlorid, the latter is compatible with plastifiers of low volatility which impart useful properties to such articles. Chlorinated hydrocarbons, such as dichlor and trichlorbenzol, alpha or beta chloronaphthalenes, are a few of the many available plastifiers.

*Example I.*

Liquid vinyl chlorid in a closed container, such as a quartz tube for instance, is exposed to ultra-violet rays from a mercury quartz lamp until a good yield of beta caoupren chlorid is obtained by partial polymerization. The time required varies with such factors as the intensity of light and distance between lamp and container and temperature. Unpolymerized vinyl chlorid is then separated from the solid polymerized material, say by volatilization and condensation. It is then ready for polymerization in its turn. Any alpha caoupren chlorid is removed from the solid residue by acetone, and then the beta form dissolved in chlorbenzol. The latter step, of course, leaves behind any gamma or delta modification. Where there is a tendency for the insoluble modifications to form while the unpolymerized vinyl chlorid is being separated, it may be useful to add substances like chlorbenzol, symmetrical tetrachlorethane, ether, ethyl or methyl alcohol, etc., just before such separation. This prevents too rapid polymerization during this separation step.

For illustration, liquid vinyl chlorid exposed in a quartz tube closely adjacent to an ultra-violet mercury light operating at 220 volts for 12 hours at about 20° C. was converted to about 90% into solid polymers containing considerable of the beta form along with much of the gamma and delta forms.

The monochlorbenzol solution, preferably about 15% strength, may be spread out into film form on a suitable surface, such as glass or polished metal, and sufficiently dried to obtain flexible transparent sheets; or a plastifier, such as ortho, meta or para dichlorbenzol, alphachlornaphthalene, etc., may be added before the film-spreading operation. These films being substantially non-inflammable, are adapted for use in the motion picture industry, for example. Their flexibility, measured by the number of folds before cracking, is far greater than that of ordinary nitrocellulose films, even when kept under adverse conditions such as in a warm and dry atmosphere.

*Example II.*

Instead of using artificial light, as in Example I, I may substitute sunlight either with or without a catalyst in the vinyl chlorid. Soluble salts of lead or uranium, such as uranium nitrate, have a catalytic action and are especially useful in sunlight. The rest of the operations are the same as in Example I. The liquids used in Example I before separation of unpolymerized vinyl chlorid, will in the present example assist in removal of the catalysts. The latter can, of course, be recovered. The proportion of catalyst can be varied greatly, depending on its catalytic power and the kind and intensity of light in which it is used. A typical proportion is 1 part of uranium nitrate to 100 parts by weight of vinyl chlorid.

*Example III.*

A solution of vinyl chlorid in an organic solvent, such as alcohol or monochlorbenzol for instance, is subjected to ultra-violet light, such as from a mercury quartz lamp, or to sunlight either with or without a catalyzer, like uranium nitrate, until insoluble gamma or delta modifications just begin to appear. Upon evaporation, the beta caoupren chlorid residue is separated from any alpha or insoluble forms by acetone and monochlorbenzol, used successively as in Example I. From it films may be prepared as in the same example. Further examples of solvents which can replace the alcohol or monochlorbenzol in the above example, are ether, methyl alcohol, ethylene chlorid, ethylene bromid, and symmetrical tetrachlorethane. They all transmit the polymerizing rays, methyl alcohol being especially good in this respect.

For illustration a pyrex glass flask containing 30% solution of vinyl chlorid in methyl alcohol is treated while closely adjacent to a 220 volt ultra-violet mercury lamp and at approximately 25° C. After about 30 hours the solids, say about 5% to 10% of the solution, are roughly 40% of the beta form and 60% of the alpha form.

*Example IV.*

Alpha caoupren chlorid, formed by polymerizing vinyl chlorid as in the preceding examples but for a shorter time, is converted into beta caoupren chlorid by either prolonged exposure to ultra-violet light, say from a mercury quartz lamp or arc lamp, or sunlight or to a prolonged heating operation, say between 50° C. and 135° C., or to both said light and heat. It is dissolved and made into films as in Example I.

*Example V.*

The polymerization of vinyl chlorid, as in Examples I, II and III, is prolonged until the principal polymers obtained are the gamma and delta forms. If the original vinyl chlorid contains non-gaseous organic chlorid impurities the production of the insoluble polymers is hastened or catalyzed. The latter, after being separated from any excess of unchanged vinyl chlorid, and, if desired, from any polymers soluble in acetone or monochlorbenzol, are heated with materials which convert them, probably by chemical reaction, into the beta or chlorbenzol-soluble form. Amines, like aniline oil, nitro compounds, such as nitrobenzol, acetophenone, pyridine, lutidine, toluidine, and xylidine are useful examples of such materials. The gamma and delta caoupren chlorid may be melted or dissolved in aniline oil sufficiently hot for that purpose until they are soluble in chlorobenzol as shown by a test sample. They are freed from aniline oil, say by precipitation with alcohol, and dissolved in chlorobenzol. If any insoluble polymers remain they can be filtered or centrifuged out. From such solution films may be prepared as in Example I.

In addition to the plastifiers and solvents mentioned above the following substances are also noted by way of further example,—naphthalene, alpha or beta bromnaphthalene, tetramethylchlorbenzol, diphenylmethan, acetophenone, orthochlorphenol, dichloracetone, benzyl chlorid, ethyl methyl ketone, xylol, ethyl acetate, ethyl benzoate, chloral, benzyl aniline, trichlorethylene, glycoldiacetate and anisole. Those which have a boiling point above 150° C. are retained in the films very readily.

Colors can be added to the solutions before they are made into films or other articles. Metallic powders can be added to produce a metallic lustre. Ivory or ebony can be simulated by other coloring matters.

Claims:

1. Polymerized vinyl chlorid, soluble in monochlorbenzol and purified from the acetone-soluble polymer until it has the property of forming films of durable flexibility from its monochlorbenzol solutions.

2. The process of preparing polymerized vinyl chlorid soluble in monochlorbenzol and insoluble in acetone, which comprises subjecting vinyl chlorid to polymerizing light action until such polymerized vinyl chlorid is produced, and separating it from other admixed polymers.

3. The process of preparing polymerized vinyl chlorid, soluble in monochlorbenzol and insoluble in acetone, which comprises subjecting a solution of vinyl chlorid in a solvent which transmits ultra-violet light to the polymerizing action of ultra-violet light action until such polymerized vinyl chlorid is produced, and dissolving acetone soluble products from said polymerized vinyl chlorid.

4. The process of preparing polymerized vinyl chlorid soluble in monochlorbenzol and insoluble in acetone, which comprises subjecting vinyl chlorid to polymerizing light action, dissolving out the acetone soluble forms and then dissolving out the chlorbenzol soluble forms.

Signed at New York, in the county of New York and State of New York, this 5th day of November, A. D. 1926.

IWAN OSTROMISLENSKY.